United States Patent [19]

Nakamichi

[11] Patent Number: 5,425,195
[45] Date of Patent: Jun. 20, 1995

[54] FISHHOOK
[75] Inventor: Shigeyuki Nakamichi, Hyogo, Japan
[73] Assignee: Owner Hook Co., Ltd., Hyogo, Japan
[21] Appl. No.: 313,551
[22] Filed: Sep. 27, 1994

Related U.S. Application Data

[63] Continuation of Ser. No. 64,867, May 20, 1993, abandoned.

[30] Foreign Application Priority Data

Mar. 1, 1993 [JP] Japan ............................ 5-066238

[51] Int. Cl.⁶ .................................. A01K 83/00
[52] U.S. Cl. ............................................ 43/44.82
[58] Field of Search ............... 43/44.82, 43.16, 44.81, 43/44.83, 44.86

[56] References Cited

U.S. PATENT DOCUMENTS

| 289,508 | 12/1883 | Dawson | 43/44.82 |
| 961,259 | 6/1910 | Reither | 43/44.82 |
| 989,392 | 4/1911 | Mueller | 43/44.82 |
| 2,523,833 | 9/1950 | Lando | 43/44.82 |
| 2,526,288 | 10/1950 | Shields | 43/44.82 |
| 2,783,580 | 3/1957 | Balboni | 43/44.82 |
| 3,092,412 | 6/1963 | Drake | 43/44.82 |
| 3,331,151 | 7/1967 | Turrentine | 43/44.82 |
| 4,433,502 | 2/1984 | Steeve | 43/44.82 |
| 4,570,373 | 2/1986 | Brief | 43/43.16 |

FOREIGN PATENT DOCUMENTS 0010275 of 1910 United Kingdom .............. 43/44.82

Primary Examiner—P. Austin Bradley
Assistant Examiner—James Miner
Attorney, Agent, or Firm—Koda and Androlia

[57] ABSTRACT

A fishhook is disclosed which has a plurality of hooks joined together in the form of anchor, such as triplehooks to be used for lure fishing. The fishhook can be manufactured simply and has a connecting ring for connection with a lure or the like centered of the whole and is subject to less resistance to water flow, thus being suppressed from undesirable movement under the water. The fishhook comprises shanks of a plurality of hooks being bundled and having a cylindrical joint member inserted into the top end of the shank bundle, the shanks and the joint member being fixed integrally together by soldering or the like, and a connecting ring formed at the top end of the cylindrical joint member. Instead of the cylindrical joint member, a joint portion may be integrally molded of a synthetic resin material at the top end of the shank portion of the bundled hooks, in which case also a connecting ring is formed at the top end of the joint portion.

5 Claims, 4 Drawing Sheets

FISHHOOK

This is a continuation of application Ser. No. 08/064,867, filed May 20, 1993, now abandoned.

BACKGROUND OF THE INVENTION

1. Field of the Invention

Fishhooks in common use, especially those designed for lures, are made up of a plurality of hooks (normally three) formed into an anchor, what is called, triplehooks. This type of fishhook has not only a plurality of hooks joined together but also a connecting ring formed at its top end.

The present invention relates to a fishhook primarily for use with a lure, as mentioned above, in which a plurality of hooks are joined together into the form of anchor and a connecting ring is formed at its top end.

2. Description of the Prior Art

Conventional triplehooks have been provided in such a way, as shown in FIG. 9, that a long-size hook A having tip bends at both ends is molded so as to be folded into two, and the portion of a connecting ring B is formed at its intermediate portion, and further another hook C is soldered to the processed hook A. The hook A is folding-molded so that its tip bends form an angle of 120 degrees in plane, while the hook B is soldered so as to be centered between the tip bends that form the angle of 240 degrees.

The conventional triplehooks have required troublesome machining processes that, with two types of hooks prepared, hook A must be folding-molded into a special angle and hook C must be soldered fixed at a special angle. Moreover, connecting ring B to be provided in the fishhook is formed by folding the hook A, resulting in a decentered positioning of the whole including fishhook C, while the shank of the hook C is protruding sideways from the connecting ring in terms of plane. As a consequence, when the fishhook is connected to a lure D as shown in FIG. 10, water resistance becomes so great that the movement of the fishhook itself becomes unstable, which is added to by unbalance of its weight, thus resulting in a possibility that a target may be miscatched.

SUMMARY OF THE INVENTION

In view of the aforementioned drawbacks of the prior art, the present invention has as its object to provide a fishhook having a plurality of hooks fixed at regular angles, which can be manufactured with high efficiency and which has a connecting ring positioned at its center of gravity so as to be subject to less water resistance and stable in its movement in actual use.

In order to achieve the above object, according to a first aspect of the present invention, there is provided a fishhook in which tip bends 1b, 2b, and 3b of a plurality of hooks 1, 2, and 3 are directed toward specified radial directions, and with shanks 1a, 2a, and 3a bundled, a tubular joint member 4 is inserted into the top end portion of the shanks, the joint member 4 and the shanks of the fishhook are bonded together by soldering or bonding, and a connecting ring 5 is formed at the top end of the joint member 4.

According to a second aspect of the present invention, there is provided a fishhook in which a joint portion 6 equivalent to the tubular joint member 4 in the first aspect of the invention is integrally molded of a synthetic resin material. For the joint portion 6 to be integrally molded of a synthetic resin material, a joint portion of synthetic resin material is molded in the state that the shanks 1a, 2a, and 3a of the hooks 1, 2, and 3 have been inserted. At the top end of the joint portion 6, the connecting ring 5 of any optional form is molded integrally.

In the first aspect of the invention, the shanks of the hooks are inserted into the tubular joint member 4 in a specified positional relation (tip bends being arranged radially at equal angles), in which state the joint member 4 and the shanks of the hooks are bonded, thus completing an anchor-shaped fishhook. In this process, if a connecting ring has been formed in the joint member 4, the connecting ring is positioned at the center of the whole, the joint portion being formed into a cylindrical shape, such that the fishhook is so shaped as to be subject to less resistance to water flow in actual use.

In the second aspect of the invention, the shanks of the hooks are disposed in a specified positional relation (tip bends being arranged radially at equal angles), in which state the joint portion 6 is molded at the top end portion of the shanks, thus completing an anchor-shaped fishhook. In this aspect of the invention, in addition to the effects of the first aspect of the invention, the joint portion can be formed into any optional shape which is subject to less resistance to water flow.

DETAILED DESCRIPTION OF THE PREFERRED EMBODIMENTS

Embodiments of the present invention are described hereinbelow with reference to the accompanying drawings.

Figure 1:
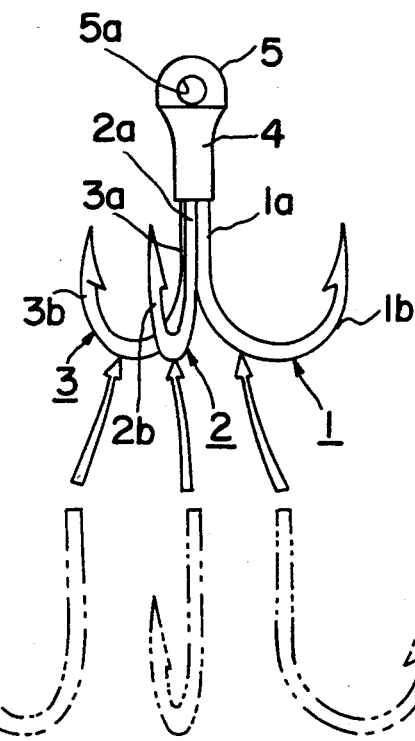
FIG. 1 is a front view showing an embodiment of the present invention according to its first aspect.

FIG. 1 is a front view showing an embodiment of the present invention according to its first aspect. Referring to the figure, shanks 1a, 2a, and 3a of three hooks 1, 2, and 3 depicted by two-dot chain lines are kept bundled, a cylindrical joint member 4 is inserted into the top end of the shank portion, and the joint member 4 and the shank portion are integrally bonded. In this process, tip bends 1b, 2b, and 3b of the hooks are arranged radially at equal intervals.

Figure 2:
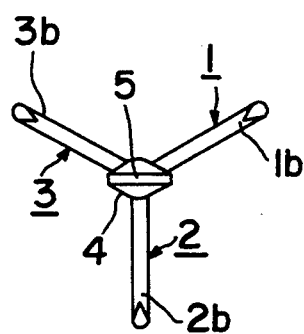
FIG. 2 is a plan view showing an embodiment of the present invention according to its first aspect.

In this embodiment, a cylindrical tube made of metal is used as the joint member 4, and the top end portion is pressed into a flatness, where a through hole 5a is bored to make a connecting ring 5. By this processing, there is provided a fishhook in which tip bends 1b, 2b, and 3b are arranged radially at equal intervals, as shown in FIG. 2, at the center of which the connecting ring 5 is positioned. The outer surface of the joint portion is a smooth cylindrical surface and is combined with the top end connecting ring 5 by a smooth slant surface, as shown in FIG. 3, thus the fishhook being subject to less resistance to water flow.

Figure 3:
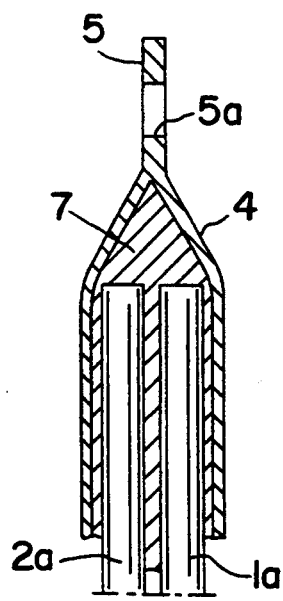
FIG. 3 is longitudinal sectional view showing an embodiment of the joint member at the top end of the fishhook according to the first aspect of the invention.
Figure 4:
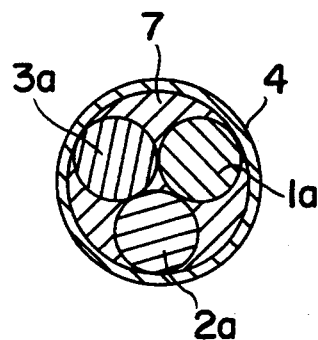
FIG. 4 is a transverse sectional view showing an embodiment of the joint member at the top end of the fishhook according to the first aspect of the invention.

The joint member 4 and the shank portion of the fishhook can be bonded in such a way that, as shown in FIG. 3 or FIG. 4, the shanks of the hooks are inserted into the cylindrical joint member 4 and a solder material 7 is filled therein to integrate them. This way of bonding may alternatively be accomplished by using some adhesive or caulking. Further, as a modification, the tubular joint member itself may be formed and structured into a rounded square cylindrical shape or the like.

Figure 5:
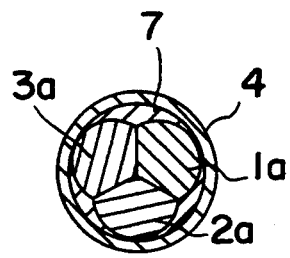
FIG. 5 is a transverse sectional view showing another embodiment of the joint member at the top end of the fishhook according to the first aspect of the invention.

The embodiment illustrated in FIG. 5 is so designed that the shanks 1a, 2a, and 3a are chamfered into an angle of 120 degrees and combined together. Such a design will allow the tip bends of the hooks to be maintained in their correct directivities, facilitating the work of bonding process. Moreover, the shanks come into contact thereamong at a larger area with increased greater bonding effect and soldering effect, while the overall size of the joint member 4 can be reduced compact with even lessened water resistance. Chamfer 8 processed to the shank portion of the fishhook is implemented at an angle of 120 degrees on the rear surface in the directions of tip bends, similarly to each of the hooks 1, 2, and 3. It is also possible to combine four hooks, in which case the angle is 90 degrees.

Figure 6:
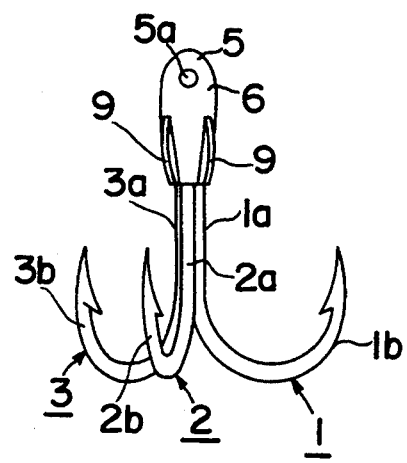
FIG. 6 is a front view showing an embodiment of the present invention according to its second aspect.
Figure 7:
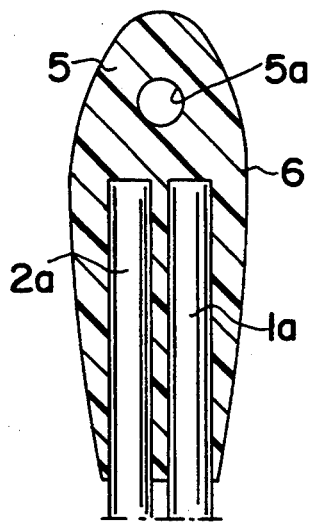
FIG. 7 is a longitudinal sectional view showing an embodiment of the joint portion at the top end of the fishhook according to the second aspect of the invention.

FIG. 6 is a front view showing an embodiment of the invention according to its second aspect. In this case, instead of fixing the joint member 4 and bonding the joint member 4 and the shanks of the hooks together, a joint portion 6 is integrally molded of a synthetic resin material. That is, in integrally molding the joint portion 6 by a synthetic resin material, the shanks of the hooks are inserted thereinto, so that they are integrally fixed.

Figure 8:
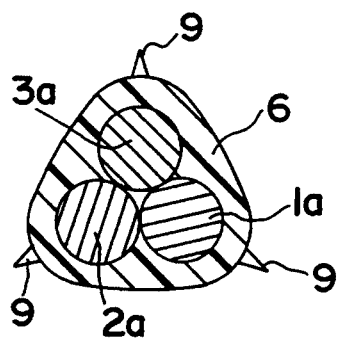
FIG. 8 is a transverse sectional view showing an embodiment of the joint portion at the top end of the fishhook according to the second aspect of the invention.
Figure 9:
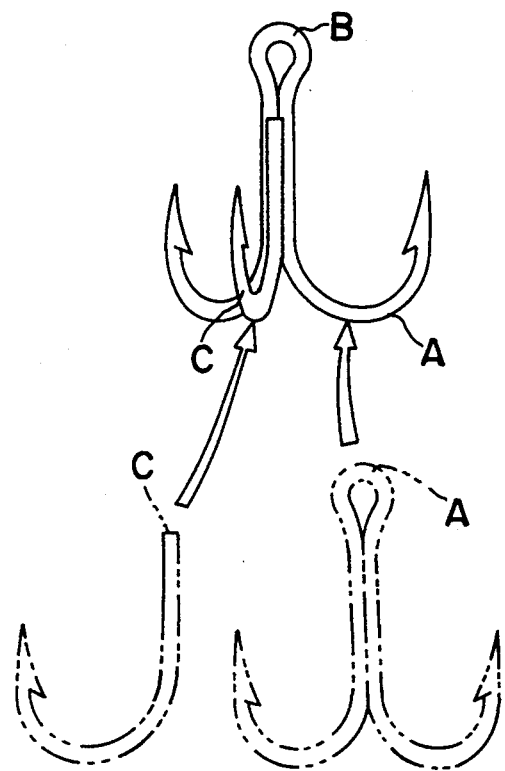
FIG. 9 is a front view showing one example of the conventional triplehook.
Figure 10:
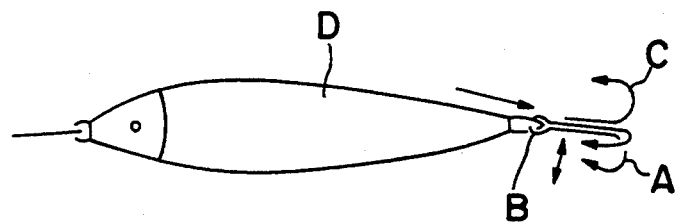
FIG. 10 is a schematic view showing one example of the state in which the conventional triplehook is actually used.

In the second aspect of the present invention, in which the joint portion 6 is integrally molded by a synthetic resin material, the joint portion itself can be formed into any optional shape, for example in a streamlined one as a whole, or rectifying fins 9 are molded on the surface of the joint portion, as shown in FIG. 8, so that the fishhook can be controlled in its movement under the water. Also, since the shape and coloring of the joint portion as a whole may be optionally selected, the joint portion can be designed so as to have a successful lure effect, meaning that the joint portion well matches the lure as a whole.

Whereas the way how the fishhook moves with respect to the lure is important for the fishhook to hit a target, the fishhook, if subjected to unbalanced force acting thereon, would result in unstable movement. This being the case, the present invention has been so devised that the fishhook is subject to less resistance and more balanced force so as to move integrally with the lure. However, that the fishhook is moved integrally with the lure is not the only way, but as another possible way, the fishhook may be arranged to move in such a special manner that its lure effect can be enhanced. The latter way can be implemented by forming various shapes of fins on the surface of the joint member 4 or the joint portion 6.

While three-hook fishhooks so called triplehooks are commonly utilized for use of the lure, the present invention allows fishhooks made up of four or more anchor-shaped hooks to be manufactured in the same process as in the three-hook ones. Thus, it becomes possible in the present invention to select the shape of the joint member 4 or the joint portion 6 and besides the number of hooks depending on the type of targeted fish or lure.

According to the fishhook of the present invention as claimed, fishhooks can be simply manufactured only by fixing the shanks of a plurality of hooks as they have been inserted into a joint member, eliminating the need of preparing a plurality of types of hooks, which has been required in the prior art. Further, it becomes possible to position the connecting ring for connection with a lure or the like at the center of the whole fishhook and to form the fishhook into such a shape as to be subject to less resistance to water flow, thus preventing the fishhook from undesirably moving against the lure.

According to the fishhook of the present invention as claimed, fishhooks can be simply manufactured only by molding the joint portion of synthetic resin material at the top end of the shank portion while the shanks of a plurality of hooks are bundled. Thus, the joint portion itself can be molded into such any optional shape that the fishhook is subject to less resistance to water flow, which adds to the advantages of the fishhook as claimed. Furthermore, the size, shape, and color of the joint portion can be designed so as to have a successful lure effect or to well match the lure. These advantages make the resulting fishhook more excellent in lure effect as a whole.

What is claimed is:

1. A fishhook comprising:
   a plurality of hooks of a same size and shape having shanks in parallel and bundled together, each of said shanks having a separate and distinct terminal end; and
   a tubular joint member having a smooth cylindrical surface and a connecting ring with a through hole formed at a top portion of the joint member said cylindrical surface integrally formed with said connecting ring, and wherein
   the hooks are each arranged to make a prescribed angle with respect to a common longitudinal axis of the bundled shanks so that tip bends of the hooks direct radially outward; and
   the bundled shanks are inserted from a bottom portion of the joint member and fixed inside thereof;
   whereby a fishhook of simple structure and having less water resistance is provided.

2. A fishhook according to claim 1, wherein said bundled shanks are fixed inside the joint member by filling solder from the bottom portion of the joint member thereinto.

3. A fishhook according to claim 1, wherein said bundled shanks are fixed inside the joint member by filling an adhesive from the bottom portion of the joint member thereinto.

4. A fishhook according to claim 2 or 3, wherein a portion having a smooth slanted surface is formed between the connecting ring and the smooth cylindrical surface, thereby reducing a water resistance.

5. A fishhook comprising:

a plurality of hooks of a same size and shape having shanks in parallel and bundled together, each of said shanks having a separate and distinct terminal end; and a tubular joint element made of a synthetic resin, molded at a top portion of the bundled shanks and having a connecting ring with a through hole formed at a top portion of the joint element, and wherein the hooks are each arranged to make a prescribed angle with respect to a common longitudinal axis of the bundled shanks so that tip bends of the hooks direct radially outward; and the shanks of the plurality of hooks are arranged side by side in close, contact and in parallel relationship with each other over a prescribed length of the shank;

whereby a fishhook of simple structure and having less water resistance is provided.

* * * * *